United States Patent Office 2,736,701
Patented Feb. 28, 1956

2,736,701

LUBRICATING OIL COMPOSITION

Loren L. Neff, Fullerton, Calif., assignor to Union Oil Company of California, Los Angeles, Calif., a corporation of California No Drawing. Application April 22, 1952,
Serial No. 283,760

19 Claims. (Cl. 252—32.7)

This invention relates to mineral lubricating oil compositions having exceptional anti-corrosion, anti-wear and detergency characteristics. More specifically it relates to mineral lubricating oils which have been modified by the addition of constituents which impart these characteristics making the oil suitable for use under severe conditions such as are encountered in use in diesel engines and the like where the oil is subjected to high temperatures in contact with air. Particularly it relates to lubricating oils containing oil-soluble complexes produced by heating oil-soluble phenol-aldehyde condensation products or the oil-soluble salts of such condensation products with inorganic compounds, preferably basically reacting inorganic compounds and particularly inorganic bases.

An object of this invention is to produce lubricating oils for use under severe conditions such as in diesel engines, but which are useful in all types of internal combustion engines with improved results, which oils are noncorrosive to corrosion-sensitive bearings, which will materially reduce engine wear and which have sufficient detergent power to prevent deposition of lacquer-like and carbonaceous deposits within the engine.

It is a further object of this invention to produce lubricating oils having these characteristics, which oils consist of mineral lubricating oil containing a sufficient amount of oil-soluble modified metal phenol-aldehyde condensation product, to impart these characteristics to the oil, the modified metal phenol-aldehyde being a complex of a metal salt of a phenol-aldehyde condensation product with a selected inorganic base or basically reacting inorganic compound such as a salt of a weak inorganic acid as described herein below.

The present invention resides in mineral lubricating oils containing small amounts between about 0.2% and 4.0 or 5% of an additive material consisting of an oil-soluble complex of a salt of a phenol-aldehyde condensation product, i. e., a phenol-aldehyde resin, and a selected basically reacting inorganic compound as will be described hereinbelow. The invention resides in the complex itself and in a concentrate of the complex in mineral oil, the complex itself and the concentrate of the complex in mineral oil being readily soluble in mineral lubricating oils to produce the lubricants of this invention. These additive materials are found to greatly improve the detergency, anti-corrosion and anti-wear characteristics of mineral lubricating oils and oils containing these materials retaining these characteristics over relatively long periods of use in engines operating under severe service conditions.

By the term phenol-aldehyde condensation product or resin is meant the product obtained by condensing the hydrocarbon substituted phenol with a low molecular weight aldehyde, as for example, formaldehyde at elevated temperatures using acid or preferably basic catalysts. These products are viscous liquids to solid resins, depending upon the particular phenol employed and upon the conditions under which condensation is effected. Phenol-aldehyde condensation products are described in United States Patents Nos. 2,250,188 and 2,375,222 and since such products are commercially available and their methods of manufacture are well known further description will not be given here except to indicate methods which are particularly applicable to the preparation of the complexes of this invention. These condensations products may be converted into oil-soluble metal salts of neutralization with inorganic bases, as for example, the hydroxides of various metals such as the alkali and alkaline earth metals as well as some of the polyvalent metals, as indicated hereinbelow.

By the terms "complex phenol-aldehyde resin salt" or "modified phenol-aldehyde resin salt" as used herein is meant those oil-soluble products obtained by heating a phenol-aldehyde condensation product with more than one equivalent of an inorganic basically reacting compound such as a metal oxide, hydroxide, carbonate or bicarbonate to form the phenol-aldehyde metal salt and solubilize excess basically reacting compound in the salt or by heating the salt of a phenol-aldehyde condensation product with a basically reacting inorganic compound to solubilize the basic compound in the salt. In either case the product is soluble in mineral oil. Apparently the normally oil-insoluble basically reacting inorganic compound is solubilized by the phenol-aldehyde salt in some sort of a complex. However, regardless of whether true complex formation takes place the product which is oil-soluble and contains the phenol-aldehyde salt and solubilized inorganic compound will be referred to as a complex for the purposes of this description. Apparently the complex is relatively stable since oil solutions of the complex as prepared herein are found to be stable over relatively long periods of storage and/or use.

By the term "concentrate" or "oil concentrate of the complex of a phenol-aldehyde resin salt and inorganic basically reacting compound" it is meant to include the product obtained by dissolving 1 part of the oil-free complex in about 1 to 5 or 6 parts of oil, such as a mineral lubricating oil similar to the one in which the complex or concentrate will be used to produce the finished lubricating composition. Thus the concentrate consists of about 50 to 80 or 85% mineral oil and 15 or 20 to 50% of the oil-free complex. This concentrate is generally produced directly since preferably it is an oil solution of the phenol-aldehyde resin or resin salt that is used in preparing the complex.

In preparing a typical complex which may be added to lubricating oil to impart the desirable characteristics described herein para-tertiary amyl phenol is dissolved in about 3 parts of a mineral lubricating oil and the mixture heated to about 175° F. in the presence of a small amount of a condensation catalyst, as for example, a strong mineral acid such as hydrochloric or sulfuric acid, or preferably a base such as for example, barium hydroxide or sodium hydroxide. To the heated oil solution containing 1 equivalent of phenol is added slowly about 1.5 equivalents of formaldehyde as a 40% solution in water. This addition is carried out at such a rate that a temperature of about 175° F. is maintained. Cooling may be necessary in some instances because the reaction is exothermic. After the addition of formaldehyde is complete the mixture is heated to about 350° F. for one to two hours and then cooled. The product consists of para-tertiary amyl phenol-formaldehyde condensation product in oil solution. This product may, of course, be obtained by dissolving this phenol-formaldehyde condensation product in oil when it is available. To this product is added one equivalent, based on the phenolic groups, of a metal base such as $Ba(OH)_2$ in order to effect neutralization and form the corresponding metal salt of the condensation product. The resulting oil solution of metal salt, e. g., barium salt, is then heated and additional quantities of base or other basically reacting inorganic compound as specified hereinbelow, e. g., barium hydroxide. is added at a temperature between about 325° F. and 400° F. The basically reacting metal inorganic compound is added in the form of a solution or slurry in water and the addition is made over a period of at least about 30 minutes and preferably between 1 and about 4 hours. Heating is continued for a time sufficient to volatilize the water and solubilize the basically reacting metal inorganic compounds. The product in this case, the barium salt of para-tertiary amyl phenol-formaldehyde condensation product and solubilized or complexed barium hydroxide, contains a ratio of equivalents of barium to phenolic groups of about 2 to 1.

In the above process the initial condensation may be effected in the presence of one equivalent of barium hydroxide per equivalent of the phenol and the resulting condensation product is obtained in the form of its barium salt by effecting the condensation within the temperature range indicated. In this case the barium hydroxide serves as the catalyst as well as the neutralizing agent. Generally it is desirable to filter the product after complexing with inorganic compound has been completed to remove small amounts of residual insoluble materials and the resulting filtered product is a concentrate in oil of the complex of phenol-aldehyde resin salt and basically reacting inorganic compound.

The preparaation of the resin may be successfully carried out in the presence of a light petroleum thinner in place of the mineral lubricating oil. The solvent may be vaporized following the condensation reaction before salt formation is effected and salt formation may be carried out after adding mineral lubricating oil, or the light solvent may be vaporized following salt formation and before complexing is effected, lubricating oil being substituted for the solvent in the final step.

Although the above description has been directed to the preparation of a barium salt-barium hydroxide complex, complexes of other metal salts and certain other inorganic bases may be produced in a similar manner to give lubricating oil addition agents having similar characteristics and capable of imparting the desirable characteristics to lubricating oil compositions. Metals which may be used to form phenol-aldehyde resin salts include the other alkaline earth metals, as for example calcium, strontium and magnesium; the alkali metals sodium, potassium and lithium; and the polyvalent metals lead, tin, zinc, aluminum, copper, cadmium, mercury, vanadium, chromium, molybdenum, manganese, iron, cobalt and nickel. The alkaline earth and alkali metals form the preferred group.

The above metal salts of phenol-aldehyde condensation products or resins may be complexed, i. e., heated with inorganic bases or basic compounds to produce complexes. In organic bases and basically reacting metal inorganic compounds which may be complexed with the resin salts to prepare the complexes of this invention include the hydroxides, hydrated oxides, carbonates and bicarbonates of barium, strontium, sodium, potassium and lithium. Thus, the alkali metal compounds, sodium hydroxide, sodium carbonate, sodium bicarbonate and the corresponding potassium and lithium compounds and the alkaline earth metal compounds, barium hydroxide, barium carbonate, barium bicarbonate and the corresponding compounds of strontium may be employed. It is to be noted that the corresponding compounds of calcium and magnesium do not form complexes with the resin salts nor do the corresponding compounds of other polyvalent metals. It is not necessary that the compounds to be complexed be water-soluble. Where water solubility is slight or in case the compounds are substantially water-insoluble they may be employed, preferably in powdered form, as a slurry or suspension in water.

The phenols which may be employed in the preparation of the modified resins of this invention include those phenolic compounds which will produce oil-soluble resins with low molecular weight aldehydes and these include phenols with at least one substituent having at least 3 and preferably 4 or more carbon atoms. The substituent may be an alkyl group, such as butyl, isobutyl, amyl, tert-amyl as well as the normal iso, hexyl, heptyl, octyl, nonyl, decyl, lauryl, stearyl, oleyl and the like groups; cycloalkyl groups such as cyclopentyl, cyclohexyl, alkyl substituted cyclopentyl and cyclohexyl such as methylcyclohexyl, ethylcyclohexyl, dicyclohexyl and the like; an aryl group such as ethylphenyl, dimethylphenyl and aralkyl groups, as for example benzyl, and the like. In place of the single aromatic ring as in phenol, the aromatic nucleus of the phenol may be mono or dicyclic and, therefore, may be naphthalene nucleus.

The aldehyde which is referred to herein as a lower molecular weight aldehyde is preferably formaldehyde or acetaldehyde, although aldehydes containing up to 4 or 5 carbon atoms may be employed. Thus, propionaldehyde, butyraldehyde and furfuraldehyde may be employed to produce phenol-aldehyde resins which are useable in the preparation of the complexes of this invention.

In preparing the complexes of this invention the phenol-aldehyde resin is converted into the desired metal salt by ordinary methods, i. e., direct neutralization with a basic compound of the desired metal, or by first converting the resin into an alkali metal salt such as the sodium salt and metathesizing the sodium salt in solution in a light hydrocarbon solvent with an alcoholic solution of an alcohol-soluble salt of the desired metal. Thus, in making the aluminum salt of a phenol-aldehyde resin the sodium salt of the resin is first prepared, dissolved in a light naphtha and metathesized with an alcoholic solution of aluminum nitrate. Such methathesis reactions in non-aqueous solutions to prevent hydrolysis are well known in the art and need not be further described. The desired phenol-aldehyde salt is then dissolved in oil to give a solution containing between about 10% and about 50% by weight of the salt, such as around 30%, and this oil solution is heated to between 325° F. and 400° F. and to it is added an aqueous solution or slurry of the desired basically reacting metal inorganic compound to be complexed. This aqueous solution or slurry will be referred to herein as an aqueous mixture. The composition and rate of addition of the aqueous mixture is extremely important since it is found that if the mixture is added too rapidly or if the proportion of water in the mixture is too high, complexing or solubilizing of the basically reacting compound does not take place. Furthermore, it is important that an aqueous mixture of basically reacting metal inorganic compound be used because in the complete absence of water complexing does not occur. In this connection, barium hydrate containing 5 to 8 water molecules per molecule of barium hydroxide contains sufficient water to effect complexing without the further addition of water and hydrated compounds of this type are to be considered within the definition of aqueous mixture of basically reacting metal inorganic compound. The proportion of water in the aqueous mixture will be between 10% and 75% by weight of the mixture and the basically reacting compound will constitute, correspondingly, between 25% and 90% by weight of the mixture.

The aqueous mixture is added to the heated oil solution of resin salt, with stirring or other means of agitation, at a relatively slow rate so that at least about 30 minutes is required to complete the addition. The time required will depend upon the amount of basically reacting compound to be complexed, upon the temperature of the oil solution of resin salt and upon the proportion of water present in the aqueous mixture. Generally the aqueous mixture will be added over a period of between 1 and 4 or 5 hours and following the completion of the addition the heating is continued for an additional 15–30 minutes to effect volatilization of water and completion of the solubilization or complexing of the basically reacting compound in the oil solution of resin salt. Complete dehydration in the strict sense of this term may not be necessary. It is desirable, however, that enough of the water be volatilized that an aqueous phase does not separate on cooling following the complexing operation. Although it is not always necessary, the reaction mixture following complexing is preferably filtered, as for example, through a filtering clay, to remove residual insoluble material and clarify the product. The resulting complex is stable and is readily dissolved in mineral lubricating oil to produce a finished lubricating oil by merely mixing at ordinary temperatures. However, it is usually desirable to add the concentrate containing the complex to the desired quantity of mineral lubricating oil and heat the mixture to a temperature of 200° F. to 350° F. in order to insure complete solution or dispersion in the resulting oil. If the complex as produced is too viscous to filter it is feasible to dissolve it in a light hydrocarbon such as a low boiling gasoline or naphtha fraction and filter the resulting solution. The light solvent may then be volatilized before preparing the final lubricating oil.

The quantity of basically reacting metal inorganic compound to be solubilized, may be varied depending upon the product desired. Generally between about 0.5 and 3 equivalents of inorganic compound will be complexed with 1 equivalent of the phenol-aldehyde salt. However, in some cases it is desirable that smaller proportions, as for example 0.1 or 0.2 equivalent of the inorganic compound be solubilized. Correspondingly, the ratio of total metal in the resulting complex to phenolic groups will generally be between 1.5 and 4 to 1, although as little as 1.1 or 1.2 equivalents of metal may be present in the complex. Complexes have been produced containing as little as 1.2 equivalents of metal per equivalent of phenolic groups, which when added to mineral lubricating oils, produced oils having the desired detergency, anticorrosion and anti-wear characteristics. However, it is preferred that the ratio of equivalents of metal to phenolic groups be between 1.5 to 1 and 2.5 or 3 to 1 in order to produce complexes having the desired characteristics to the greatest degree.

In preparing complexes in which the metal salt of a phenolo-aldehyde resin is complexed with a carbonate or a bicarbonate the carbonate or bicarbonate may be complexed directly but it is generally preferred to first form the complex with the corresponding metal hydroxide and subsequently convert the hydroxide into the corresponding carbonate or bicarbonate by blowing the mixture with carbon dioxide while maintaining a temperature within the range indicated hereinabove for complex formation and preferably at a temperature of around 325° F. to 375° F. for a time sufficient to effect the desired conversion. Usually two to three or four hours is sufficient to convert the hydroxide into carbonate and somewhat longer times may be required to convert the hydroxide into the bicarbonate.

In preparing the final lubricating oil compositions between about 0.2% and 6% or 7% of the complex of phenol-aldehyde resin salt with inorganic base calculated on an oil-free basis will be employed, although usually between about 0.5% and 5.0% of the complex calculated on an oil-free basis will give adequate protection for most uses.

Although mineral lubricating oils containing the modified phenol-aldehyde salts of this invention, i. e., the complexes of the salts with basically reacting metal inorganic compounds are outstanding lubricating oils it is sometimes desirable to include one or more other detergents and/or anti-corrosion agents in the final lubricating oil composition along with the complexes to improve further the detergency and/or anti-corrosion characteristics of the finished oil.

SUPPLEMENTAL DETERGENTS

In particular utilizations where extremely high detergency is required it is desirable to add to the lubricating oil containing the phenol-aldehyde salt complex small amounts of supplemental detergents. The following detergents are found to cooperate with the complex to produce lubricating oils having outstanding detergency.

Oil-soluble sulfonates such as the oil-soluble metal salts of mahogany sulfonic acids obtained by treatment of lubricating oil fractions of petroleum with sulfuric acid, $SO_3$, or chlorosulfonic acid, which method of preparation is well known in the art, appear to co-operate with the complexes of this invention to produce outstanding mineral lubricating oils.

Another detergent which appears to co-operate with the phenol-aldehyde salt complexes is a modified sulfonate prepared by heating an oil-soluble metal petroleum sulfonate with an inorganic base to solubilize the base in the sulfonate. Thus, mahogany sulfonic acids may be reacted with inorganic bases as, for example, with metal oxides, hydroxides, carbonates and bicarbonates, to produce oil-soluble complexes containing a ratio of equivalents of metal to sulfonic acids between 1.1 to 1 and 3 or more to 1 and these materials are found to impart exceptional detergency characteristics to lubricating oils containing the complexes of this invention. Thus, the addition of 2.5% by weight of a complex produced by heating sulfonic acids with 2 equivalents of barium hydroxide to a temperature of 300° F. for a time sufficient to solubilize the barium hydroxide in the sulfonate is found to impart exceptional detergent characteristics to the oils of this invention.

Other detergents which may be employed and are found to cooperate with the described complexes of this invention to produce improved lubricating oils include the oil-soluble metal salts of rosin acids such as abietic acid, hydrogenated rosin acids and the like. The metal salts of rosin acids are described in United States Patent No. 2,233,203 and soaps of hydrogenated rosin acids are described in United States Patent No. 2,280,338. Still other detergents which may be employed as supplemental agents to give similar improvements include the oil-soluble metal salts of synthetic organic acids produced by oxidizing hydrocarbons or hydrocarbon fractions such as highly paraffinic lubricating oils, paraffin wax and the like. These compounds are described in United States Patent No. 2,270,620. Still other types of supplemental detergents include the oil-soluble metal salts of fatty acids, halogenated fatty acids and aryl substituted fatty acids such as dichloro stearic acid, phenyl stearic acids and the like.

ANTI-CORROSION AGENTS

It is sometimes desirable to add supplemental anti-corrosion agents to mineral lubricating oils containing the phenol-aldehyde resin salts complexed with inorganic bases to produce oils having exceptional anti-corrosion characteristics. It is found that certain of the well known anti-corrosion agents do co-operate with the additives of this invention to produce these high quality oils. The following materials appear to be outstanding in their ability to co-operate in this manner: Oil-soluble metal salts of the acidic reaction products obtained by reacting phosphorus pentasulfide, or in some instances, phosphorus pentoxide, with an alcohol are particularly desirable anti-corrosion agents. The preferred reaction products are those obtained with phosphorus pentasulfide and these products may be referred to as organic substituted thiophosphates.

The alcohols which may be employed in the preparation of desirable thiophosphates include the aliphatic alcohols, such as butyl, amyl, iso-amyl, hexyl, and heptyl, octyl alcohol, lauryl alcohol, cetyl alcohol and the like. These alcohols may be modified by the inclusion of phenyl and kindred aromatic groups forming alkaryl or aralkyl substituted alcohols. Also cyclo aliphatic alcohols such as cyclopentanol, cyclohexanol, cycloheptanol or the alkyl substituted cyclo aliphatic alcohols in which the alkyl substituent contains less than about 10 carbon atoms and preferably about 5 or less carbon atoms may be employed. Thus the substituent groups will include preferably the methyl, ethyl, propyl, and amyl radicals and the methyl, ethyl, propyl, and amyl cyclohexanols are the preferred alcohols of this class. Other alcohols which may be employed are those containing an aromatic nucleus such as benzyl alcohol. Also in some instances phenols may be employed in place of the alcohol giving aryl substituted thiophosphates, as for example, phenyl substituted thiophosphates or methylphenyl substituted thiophosphates.

The reaction products may be converted into the corresponding metal salts by direct reaction with a basic compound of the desired metal or by first neutralizing with sodium hydroxide to form the sodium salt and subsequently metathesizing the sodium salt with a salt of the desired metal. Thus the sodium salt may be reacted with zinc chloride to form the zinc salt of the reaction product.

Another class of anti-corrosion agents includes those compounds which may be defined as oil-soluble metal salts or soaps of high molecular weight, non-carboxylic weak acids having ionization constants below about $5 \times 10^{-6}$. This class of compounds includes the oil-soluble metal salts of alkyl substituted phenol sulfides or alkylated phenolic thioethers. It also includes the oil soluble metal soaps or salts of thiophenols, alcohols, enols, oximes or sulfo-amides. These weak acid salts and soaps are described in the United States Patent No. 2,280,419.

Another class of anti-corrosion agents which may be employed includes the oil-soluble metal salts of phosphorus and sulfur containing reaction products of a sulfide of phosphorus and a hydrocarbon. These materials are obtained by reacting phosphorus pentasulfide with a hydrocarbon having a molecular weight greater than about 120 and subsequently neutralizing the reaction product with a basic metal compound. A description of these materials and methods for their preparation are given in United States Patent No. 2,316,082.

Still another type of anti-corrosion agent consists of the oil-soluble metal salts of phosphinic or phosphonic acids obtained by treating hydrocarbons with elementary phosphorus and subsequently forming the metal salts of the reaction products. Such compounds are described in United States Patent No. 2,311,305.

Desirable metals to be employed in the preparation of the supplemental oil-soluble metal detergents and the supplemental anti-corrosion agents include the alkaline earth metals, calcium, barium and strontium, and the polyvalent metals zinc, aluminum, tin, copper, magnesium, iron, nickel, mercury and chromium. Also, in some instances, alkali metal salts or soaps may be employed such as the sodium, potassium and lithium compounds, particularly in those instances in which the alkali metal compounds are sufficiently soluble in oil.

In some cases where extreme conditions of engine operation are to be met the lubricating oil may contain, in addition to the complex of this invention, both a supplemental detergent and supplemental anti-corrosion agent. Thus, a particularly desirable lubricating oil having exceptional detergency, anti-corrosion and anti-wear characteristics is prepared by adding to a highly solvent treated Western paraffinic lubricating oil of SAE 30 grade 3% by weight on an oil-free basis of barium tert-amyl phenol-formaldehyde complex with barium hydroxide, 1.5% by weight of barium sulfonate and 1.5% by weight of the barium salt of the product obtained by reacting octyl alcohol with phosphorus pentasulfide. Similar combinations of the various additives described herein produce oils of similar high quality.

The proportion of supplemental detergent and/or supplemental anti-corrosion agent to be employed together with the described amounts of phenol-aldehyde salt complexes of this invention will be between about 0.1% and about 5% and preferably between about 0.5% and 3%.

The metal contents of the resin salts and the complexes of this invention are measured by a determination of the total base number of the products. Total base number is determined according to the method described in A. S. T. M. Standards on Petroleum Products and Lubricants prepared by A. S. T. M. Committee D-2, 1950, page 244, test number D664-49.

The following examples illustrate the principles of the invention:

*Example I*

The calcium salt of the tert-octylphenol-formaldehyde resin is prepared by heating a mixture of 500 grams of tert-octylphenol, 2580 grams of SAE 10 solvent-treated paraffinic lubricating oil and 189 grams of calcium hydroxide to a temperature of 175° F. with stirring. To this mixture is added 291 grams of a 40% aqueous formaldehyde solution at a temperature of 175° F. over a period of about 15 minutes. The reaction mixture is heated to 345° F. and clarified by filtering under vacuum through a layer of diatomaceous earth to yield a filtrate having a total base No. of 33.7 mg. KOH/g. The filtrate, referred to hereinafter as product A, is an oil concentrate of the calcium salt of tert-octylphenol-formaldehyde resin.

An aqueous mixture consisting of 58 grams of anhydrous barium hydroxide and 25 grams of water is added slowly to a 500 gram portion of product A over a period of 1.5 hours at a substantially uniform rate. During the addition the oil solution is agitated and is maintained at a temperature of 340-350° F. The reaction mixture is filtered under vacuum through a layer of diatomaceous earth to yield a filtrate having a total base No. of 50.6 mg. KOH/g. The filtrate, referred to hereinafter as product B, is an oil concentrate of a complex of barium hydroxide and the calcium salt of tert-octylphenol-formaldehyde resin. This product contains 0.5 equivalent of barium hydroxide per equivalent of calcium resin salt.

An aqueous mixture of 27 grams of sodium hydroxide and 25 grams of water is added to a 500 gram portion of product A over a period of 1.5 hours at a substantially uniform rate. During the addition the temperature of the reaction mixture is maintained at approximately 345° F. When all of the aqueous mixture is added the temperature of the reaction mixture is maintained at about 345° F. for an additional 30 minutes and the product is then filtered under vacuum through a layer of diatomaceous earth to yield a filtrate having a total base No. of 52.9 mg. KOH/g. by the A. S. T. M. D664-49 method. The filtrate, referred to hereinafter as product C, is an oil concentrate of a complex of sodium hydroxide and the calcium salt of tert-octylphenol-formaldehyde resin. This product contains 0.6 equivalent of sodium hydroxide per equivalent of calcium resin salt.

Lubricating oils prepared by dissolving 15% by weight of products B and C, respectively, in an SAE 30 solvent treated Western paraffinic lubricating oil having a V. I. of 85 have good detergency, anti-corrosion and anti-wear characteristics as determined by engine tests.

*Example II*

A calcium salt of tert-octylphenol-formaldehyde resin is prepared by dissolving 220 grams of the resin in 1980 grams of an SAE 30 solvent treated paraffinic lubricating oil and heating the mixture with agitation at about 300° F. until a homogeneous solution is formed. To 500 grams of this oil solution is added 12 grams of calcium hydroxide and 12 grams of water and the mixture heated with agitation at 185° F. for 2 hours. The mixture is then cooled to 150° F. and 95% ethyl alcohol (20 ml.) is added. Heating is continued and the mixture is maintained at 180° F. for 2 hours. The product is then heated to 300° F. and filtered under vacuum through a layer of diatomaceous earth to yield a filtrate having a total base No. of 8.6 mg. KOH/g. This filtrate, referred to hereinafter as product D, is an oil solution of the calcium salt of tert-octylphenol-formaldehyde resin.

An unsuccessful attempt to form the calcium hydroxide-calcium resin salt complex was made. In this experiment an aqueous mixture consisting of 10 grams of calcium hydroxide and 10 grams of water was added slowly with agitation to a 400 gram portion of product D while maintaining the reaction mixture at a temperature of 385° F. The addition took place at a substantially uniform rate over a period of 2 hours. When all the aqueous mixture was added the reaction mixture was maintained at a temperature of about 385° F. for an additional 45 minutes and then filtered under vacuum througn a layer of diatomaceous earth to yield a filtrate having a total base No. of 8.3 mg. KOH/g. The filtrate does not contain more total base than product D, and therefore, no complexing or solubilizing of excess base occurred.

Similarly it is found that no complexing occurs when an aqueous mixture of magnesium hydroxide and water is added to product D under the same conditions employed with calcium hydroxide.

*Example III*

The barium salt of tert-amylphenol-formaldehyde resin is prepared by dissolving 1 part of the resin in 2 parts of mineral lubricating oil and neutralizing the resin by heating the oil solution with agitation with an aqueous slurry of 1 equivalent of barium hydroxide, based on the phenol content of the resin. The resulting oil solution of the barium salt of tert-amylphenol-formaldehyde resin will be referred to hereinafter as product E.

An attempt was made to form a barium resin salt-barium hydroxide complex by merely heating a mixture of 1 equivalent of product E with 1.6 equivalents of aqueous barium hydroxide. The product did not contain more barium than product E before treatment and therefore no complexing or solubilizing occurred. In this case a 50% aqueous mixture of barium hydroxide was added to product E at ordinary temperatures and the reaction mixture was heated gradually to a temperature of 350° F. with constant vigorous stirring and this temperature was maintained for a period of 2.5 hours. After filtering, the reaction product had the same total base number as product E.

A barium hydroxide complex with the barium salt of tert-amylphenol-formaldehyde resin was prepared following the teaching of this invention. In this case 1 equivalent of product E was heated to 350° F. and to the heated solution was added a 50% aqueous mixture of 1.6 equivalents of barium hydroxide. The addition took place slowly over a period of 1 hour and the reaction mixture was stirred constantly over this period. When all the aqueous mixture had been added the reaction mixture was maintained at a temperature of about 350–370° F. for an additional 15 minutes and then filtered under vacuum through a layer of diatomaceous earth to yield a filtrate having a total base number 2.5 times as great as the total base number of product E. The filtrate is an oil solution of a complex of barium hydroxide and the barium salt of tert-amylphenol-formaldehyde resin.

A lubricating oil prepared by dissolving 15% by weight of the above filtrate in mineral lubricating oil has excellent detergency, anti-corrosion and anti-wear characteristics determined by engine tests.

*Example IV*

The procedures of Example III repeated employing the strontium salt of tert-amylphenol-formaldehyde condensation product and strontium hydroxide give substantially the same results. The concentrate obtained following the procedures of this invention and the resulting lubricating oil have characteristics similar to those of the corresponding products of Example III.

*Example V*

A complex of sodium hydroxide-sodium salt of tert-octylphenol-formaldehyde condensation product is prepared by heating a solution of 25% by weight of the sodium salt in mineral oil to a temperature of 390° F. and adding 3 equivalents, based on the phenolic group of the condensation product, of sodium hydroxide in the form of a 40% aqueous solution. The sodium hydroxide is added slowly, with constant stirring, over a period of 1 hour. Following the addition of the hydroxide, the reaction mixture is treated for an additional 25 minutes and then filtered to remove small amounts of insoluble materials. As indicated by total base number determination this product contains more than 2.5 times the metal content of the original oil solution of sodium salt.

A portion of this concentrate is dissolved in a mineral lubricating oil similar to the one described in Example I using one part of the concentrate in 20 parts of lubricating oil. The resulting oil has excellent detergency, anti-corrosion and anti-wear characteristics as indicated by its successful operation in diesel engines.

*Example VI*

A second portion of the concentrate produced in Example V is heated to a temperature of 300° F. and carbon dioxide is bubbled into the mass for a period of about seven hours at this temperature. The resulting product consists of a complex of sodium carbonate and the sodium salt of tert-octylphenol-formaldehyde condensation product. This concentrate, dissolved in lubricating oil to give a finished oil containing 2% by weight of the complex on an oil-free basis, gives an oil having the desirable characteristics of the lubricating oils of this invention.

*Example VII*

A third portion of the concentrate produced in Example V is heated to 300° F. and blown with carbon dioxide for a period of about three hours to convert the solubilized sodium hydroxide into sodium bicarbonate. The resulting complex of sodium bicarbonate and the sodium salt of tert-octylphenol-formaldehyde condensation product is dissolved in mineral lubricating oil to give a finished oil containing 1.7% by weight of the complex on an oil-free basis. This lubricating oil has the desirable characteristics of the lubricating oils of this invention.

*Example VIII*

Isobutyl phenol-formaldehyde resin is converted into its barium salt by treatment in the usual manner with the chemically equivalent amount of barium hydroxide. The resulting product is dissolved in 2 parts by weight of mineral lubricating oil and to this oil solution is added, with agitation at a temperature of about 370° F. over a 3 hour period, an aqueous mixture containing 1 equivalent, based on the barium salt of sodium hydroxide in the form of a 50% aqueous solution. The reaction mixture is filtered under vacuum through a layer of diatomaceous earth to yield as filtrate a concentrate of a sodium hydroxide-barium phenol-formaldehyde resin salt in oil. This product is added to lubricating oil in an amount sufficient to impart a complex content on an oil-free basis of 2.5% by weight and the resulting oil has detergent, anti-corrosion and anti-wear properties.

Potassium hydroxide substituted for sodium hydroxide in the above preparation gives a complex and a lubricating oil having characteristics similar to those obtained with sodium hydroxide.

Example IX

A solution of lithium tert-octylphenol-formaldehyde resin in about 2 parts by weight of mineral lubricating oil is heated with agitation to 390° F. and an aqueous mixture containing 0.75 equivalent, based on the lithium resin salt, of lithium hydroxide is added slowly over a period of 1.5 hours. Heating is continued for about 1 hour and the mixture is then filtered. The resulting oil concentrate has a total base number 1.5 times the total base number of the product before complexing and consists of a lithium hydroxide-lithium phenol-aldehyde resin complex in oil solution. When this solution is added to mineral lubricating oil in an amount sufficient to produce an oil containing 1.5% of the complex calculated on an oil-free basis the oil is found to have good detergent, anti-corrosion and anti-wear characteristics.

Example X

A phenol-aldehyde resin is prepared by heating an oil solution of tert-octyl phenol with aqueous acetaldehyde in the presence of an amount of calcium hydroxide equivalent to the phenol. Heating for four hours at a temperature of about 180° F. results in the formation of the calcium salt of tert-octylphenol-acetaldehyde resin. This product is heated to 325° F. and to it is added slowly 1 equivalent, based on the calcium resin salt of a 40% aqueous solution of potassium hydroxide over a period of 50 minutes. The resulting concentrate after further heating and filtration has a total base number twice as great as the total base number of the resin salt. A mineral lubricating oil containing sufficient of the concentrate to give an oil containing 1.2% of the complex on an oil-free basis, has the desirable characteristics of the oil of this invention.

Example XI

An oil solution of tert-octylphenol is heated to 175° F. with a small amount of barium hydroxide as catalyst and 1.5 equivalents based on the phenolic groups of propionaldehyde is added over a period of thirty minutes. The product is heated to 350° F. for two hours and sufficient additional barium hydroxide is added to convert the resin into its barium salt.

The barium resin salt is complexed with 1 equivalent of barium hydroxide according to the method of Example III to produce a complex having characteristics typical of the product of this invention and having a total base number 1.9 times as great as the barium resin salt.

The foregoing description and examples of the invention are not to be considered as limiting for many variations may be made by those skilled in the art without departing from the spirit and scope of the following claims.

I claim:

1. A lubricating oil additive concentrate adapted for addition to mineral lubricating oil which comprises a mineral oil solution containing 15% to 50% of an oil-soluble complex obtained by heating an oil solution of an oil-soluble metal salt of a hydrocarbon substituted phenol-aldehyde resin, in which the aldehyde has not more than 5 carbon atoms per molecule, to a temperature between about 325° F. and about 400° F., adding to the heated solution an aqueous mixture of at least one basically reacting metal inorganic compound selected from the class consisting of the hydroxides, carbonates and bicarbonates of barium, strontium, sodium, potassium and lithium, said mixture containing between about 25% and about 90% by weight of said compound and being added at a rate such that the addition takes place over a period of at least about 30 minutes and continuing the heating for a time sufficient to volatilize water thereby solubilizing between about 0.1 and about 3 equivalents of said basically reacting metal inorganic compound per equivalent of phenol-aldehyde resin salt in the oil solution of said resin salt.

2. A composition according to claim 1 in which the metal of the resin salt is an alkaline earth metal.

3. A composition according to claim 1 in which the metal of the resin salt is an alkali metal.

4. A composition according to claim 1 in which the metal of the resin salt and of the basically reacting metal inorganic compound is barium.

5. A mineral lubricating oil containing a minor but effective proportion, between about 0.2% and about 7%, sufficient to impart detergency, anti-corrosion and anti-wear characteristics to said oil, of a complex formed by heating an oil solution of an oil-soluble metal salt of a hydrocarbon substituted phenol-aldehyde resin to a temperature between about 325° F. and about 400° F., adding to said heated solution an aqueous mixture of at least one basically reacting metal inorganic compound selected from the class consisting of the hydroxides, carbonates and bicarbonates of barium, strontium, sodium, potassium and lithium, said mixture containing between about 25% and about 90% by weight of said compound, at a rate such that the addition requires at least about 30 minutes and continuing the heating for a time sufficient to volatilize water thereby solubilizing between about 0.1 and about 3 equivalents of said basically reacting metal inorganic compound per equivalent of resin salt in the oil solution of resin salt, the aldehyde of said phenol-aldehyde resin being a lower aldehyde containing not more than about 5 carbon atoms per molecule.

6. A lubricating oil according to claim 5 in which the metal of the resin salt is an alkaline earth metal.

7. A lubricating oil according to claim 5 in which the metal of the resin salt is an alkali metal.

8. A lubricating oil according to claim 5 in which the metal of the resin salt and of the basically reacting metal inorganic compound is barium.

9. A lubricating oil according to claim 5 in which said basically reacting metal inorganic compound is barium hydroxide.

10. A lubricating oil according to claim 5 in which the metal of the basically reacting metal inorganic compound is an alkali metal.

11. A lubricating oil according to claim 5 in which said basically reacting metal inorganic compound is strontium hydroxide.

12. A lubricating oil according to claim 5 in which the metal of the resin salt and the metal of the basically reacting metal inorganic compound is sodium.

13. A method of preparing a lubricating oil additive concentrate which comprises heating an oil solution containing between about 15% and about 50% by weight of an oil-soluble metal salt of hydrocarbon substituted phenol-aldehyde resin, in which the aldehyde has not more than 5 carbon atoms per molecule, to a temperature between about 325° F. and about 400° F. and adding to the heated solution an aqueous mixture of at least one basically reacting metal inorganic compound selected from the class consisting of the hydroxides, carbonates and bicarbonates of barium, strontium, sodium, potassium and lithium, said aqueous mixture containing between about 25% and about 90% by weight of said compound and being added at a rate such that the addition takes place over a period of at least about 30 minutes and continuing the heating for a time sufficient to volatilize water thereby solubilizing between about 0.1 and about 3 equivalents of said compound per equivalent of phenol-aldehyde resin salt in the oil solution of said resin salt.

14. A method of preparing a mineral lubricating oil having detergent, anti-corrosion and anti-wear characteristics which comprises heating an oil solution containing between about 15% and about 50% by weight of an oil-soluble metal salt of hydrocarbon substituted phenol-aldehyde resin, in which the aldehyde has not more than 5 carbon atoms per molecule, to a temperature between about 325° F. and about 400° F. and adding to the heated solution an aqueous mixture of at least one basically reacting metal inorganic compound selected from the class consisting of the hydroxides, carbonates and bicarbonates of barium, strontium, sodium, potassium and lithium, said aqueous mixture containing between about 25% and about 90% by weight of said compound and being added at a rate such that the addition takes place over a period of at least about 30 minutes and continuing the heating for a time sufficient to volatilize water thereby solubilizing between about 0.1 and about 3 equivalents of said compound per equivalent of phenol-aldehyde resin salt in the oil solution of said resin salt, and dissolving the resulting solution in mineral lubricating oil to produce an oil containing between about 0.2% and about 7% by weight of the phenol-aldehyde resin salt and solubilized basically reacting metal inorganic compound.

15. A method according to claim 14 in which the metal of said metal salt is an alkaline earth metal.

16. A method according to claim 14 in which the metal of said metal salt is an alkaline earth metal and the metal of said basically reacting metal inorganic compound is barium.

17. A method according to claim 16 in which said alkaline earth metal is barium.

18. A mineral lubricating oil according to claim 5 containing also between 0.1% and 5% of a supplemental detergent selected from the class consisting of oil-soluble metal sulfonates and modified oil-soluble metal sulfonates prepared by reacting mahogany sulfonic acids with an inorganic base selected from the class consisting of metal oxides, hydroxides, carbonates and bicarbonates, which modified sulfonates contain a ratio of equivalents of metal to sulfonic acids between about 1.1 and 3.

19. A mineral lubricating oil according to claim 5 containing also between about 0.1% and about 5% of a supplemental anti-corrosion agent selected from the class consisting of oil-soluble metal thiophosphates, oil-soluble salts of non-carboxylic weak acids having ionization constants below about $5 \times 10^{-6}$ and oil-soluble salts of phosphorus and sulfur containing reaction products of a sulfide of phosphorus and a hydrocarbon.

References Cited in the file of this patent

UNITED STATES PATENTS

| | | |
|---|---|---|
| 2,250,188 | Wilson | July 22, 1941 |
| 2,375,222 | Griffin et al. | May 8, 1945 |
| 2,647,873 | Matthews et al. | Aug. 4, 1953 |